US012784724B2

(12) United States Patent
Echeveste et al.

(10) Patent No.: US 12,784,724 B2
(45) Date of Patent: Nov. 3, 2026

(54) SYNCHRONIZATION OF A PRE-RECORDED MUSIC ACCOMPANIMENT ON A USER'S MUSIC PLAYING

(71) Applicant: ANTESCOFO, Paris (FR)

(72) Inventors: José Echeveste, Paris (FR); Philippe Cuvillier, Paris (FR); Arshia Cont, Gentilly (FR)

(73) Assignee: ANTESCOFO, Paris (FR)

( * ) Notice: Subject to any disclaimer, the term of this patent is extended or adjusted under 35 U.S.C. 154(b) by 1071 days.

(21) Appl. No.: 17/799,213

(22) PCT Filed: Feb. 1, 2021

(86) PCT No.: PCT/EP2021/052250
§ 371 (c)(1),
(2) Date: Aug. 11, 2022

(87) PCT Pub. No.: WO2021/165023
PCT Pub. Date: Aug. 26, 2021

(65) Prior Publication Data

US 2023/0082086 A1 Mar. 16, 2023

(30) Foreign Application Priority Data

Feb. 20, 2020 (EP) .................................... 20305168

(51) Int. Cl.
*G10H 1/40* (2006.01)
*G10H 1/36* (2006.01)

(52) U.S. Cl.
CPC ............... *G10H 1/40* (2013.01); *G10H 1/361* (2013.01); *G10H 2210/005* (2013.01);
(Continued)

(58) Field of Classification Search
CPC .... G10H 1/40; G10H 1/361; G10H 2210/005; G10H 2210/076; G10H 2210/391; G10H 2240/325
(Continued)

(56) References Cited

U.S. PATENT DOCUMENTS

| | | | | |
|---|---|---|---|---|
| 8,637,757 B2 * | 1/2014 | Reynolds | ............... | G09B 15/00 84/610 |
| 2017/0124898 A1 * | 5/2017 | Shaffer | ................. | G06F 16/635 |

(Continued)

FOREIGN PATENT DOCUMENTS

| | | |
|---|---|---|
| EP | 0477869 A2 | 4/1992 |
| EP | 3223274 A1 | 9/2017 |
| WO | 98/58364 A1 | 12/1998 |

OTHER PUBLICATIONS

International Search Report issued on Mar. 23, 2021 in corresponding International Application No. PCT/EP2021/052250; 4 pages.
(Continued)

*Primary Examiner* — Jianchun Qin
(74) *Attorney, Agent, or Firm* — Maier & Maier, PLLC

(57) ABSTRACT

A method for synchronizing a pre-recorded music accompaniment to a music playing of a user. The music playing is captured by at least one microphone, which delivers an input acoustic signal feeding a processing unit, which includes a memory for storing data of the music accompaniment and provides an output acoustic signal based on the music accompaniment data to feed at least a loudspeaker playing the music accompaniment. The processing unit analyses the input acoustic signal to detect musical events and music tempo, compares the detected musical events to the music accompaniment data to determine at least a lag between the timings of the detected musical events and the musical events of the music accompaniment, and adapts a timing of the output acoustic signal based on the lag and a synchro-
(Continued)

nization function calculated from a temporal variable, the user's music tempo, and the duration of compensation of the lag.

11 Claims, 3 Drawing Sheets

(52) U.S. Cl.
CPC . *G10H 2210/076* (2013.01); *G10H 2210/391* (2013.01); *G10H 2240/325* (2013.01)

(58) Field of Classification Search
USPC .......................................................... 84/636
See application file for complete search history.

(56) References Cited

U.S. PATENT DOCUMENTS

| | | | | |
|---|---|---|---|---|
| 2018/0181730 | A1* | 6/2018 | Lyske | G06F 21/16 |
| 2019/0156809 | A1 | 5/2019 | Maezawa | |
| 2021/0110803 | A1* | 4/2021 | Fayan | G09B 15/023 |

OTHER PUBLICATIONS

Christopher Raphael, "Music Plus One and Machine Learning", in Proceedings of the 27th International Conference on Machine Learning (ICML), Haifa, Israel, 21-28, 2010, 8 pgs.

Roger B Dannenberg, "Abstract time warping of compound events and signals" in Computer Music Journal, 61-70, 1997, 15 pgs.

Arshia Cont, José Echeveste, Jean-Louis Giavitto, and Florent Jacquemard, "Correct Automatic Accompaniment Despite Machine Listening or Human Errors in Antescofo", in Proceedings of International Computer Music Conference (ICMC), Ljubljana (Slovenia), 2012, 7 pgs.

Dawen Liang, Guangyu Xia, and Roger B Dannenberg, "A framework for coordination and synchronization of media", in Proceedings of the International Conference on New Interfaces for Musical Expression, p. 167-172, 2011, 6 pgs.

Arshia Cont, "A Coupled Duration-Focused Architecture for Real-Time Music-to-Score Alignment", IEEE Transactions on Pattern Analysis and Machine Intelligence, Institute of Electrical and Electronics Engineers, 2010, 32, Submitted on May 2, 2010, 15 pgs.

* cited by examiner

SYNCHRONIZATION OF A PRE-RECORDED MUSIC ACCOMPANIMENT ON A USER'S MUSIC PLAYING

FIELD

The present disclosure is related to data processing providing a real-time musical synchrony between a human musician and pre-recorded music data providing accompaniments of the human musician.

BACKGROUND

The goal is to grasp the musical intention of the performer and map them to that of the pre-recorded accompaniment to achieve an acceptable musical behavior.

Some known systems deal with the question of real-time musical synchrony between a musician and accompaniment.

Document D1: Christopher Raphael (2010): "*Music Plus One and Machine Learning*", in Proceedings of the 27th International Conference on Machine Learning (ICML), Haifa, Israel, 21-28, is related to learning systems where the intention of musician is predicted from models that are trained on actual performances of the same performer. Despite the issue of data availability for training, the synchronization depends here on high-level musical parameters (such as musicological data) rather than probabilistic parameters of an event. Moreover, statistical or probabilistic predictions undermine the extreme variability of performances between sessions (and for a same performer). Furthermore, this approach relies on synchronizing musician events with computer actions. Computer actions do not model high-level musical parameters and thus are impractical.

Document D2: Roger B Dannenberg (1997): "*Abstract time warping of compound events and signals*" in Computer Music Journal, 61-70, takes the basic assumption that the musician tempo is continuous and kept between two events, resulting into a piece-wise linear prediction of the music position used for synchronization. In any real-world setup, tempo discontinuity is a fact that leads to failure of such approximations. Moreover, this approach takes only into account musician's Time-Map and undermines the pre-recorded accompaniment Time-Map (assuming it fixed) and thus missing important high-level musical knowledge.

Document D3: Arshia Cont, José Echeveste, Jean-Louis Giavitto, and Florent Jacquemard. (2012): "*Correct Automatic Accompaniment Despite Machine Listening or Human Errors in Antescofo*", in Proceedings of International Computer Music Conference (ICMC), Ljubljana (Slovenia), incorporates the notion of Anticipation with a cognitive model of the brain to estimate musician's time-map. In order to incorporate high-level musical knowledge for accompaniment synchronization, they introduce two types of synchronizations: Tight Synchronization is used to ensure that certain key positions are tightly synchronized.

While appropriate, their solution introduces discontinuities in the resulting Time-Map. Such discontinuities are to be avoided when synchronizing continuous audio or video streams. Smooth Synchronization attempts to produce a resulting continuous Time-Map by assuming that the resulting accompaniment tempo is equal to that of the musician and predicting its position using that value.

Despite this appropriate tempo detection, the real-time tempo is prone to error and can lead to unpredictable discontinuities. Furthermore, coexistence of the two strategies in the same session poses further discontinuities in the resulting time-map.

Document D4: Dawen Liang, Guangyu Xia, and Roger B Dannenberg (2011): "*A framework for coordination and synchronization of media*", in Proceedings of the International Conference on New Interfaces for Musical Expression (p. 167-172), proposes a compromise between sporadic synchronization such as Tight above and tempo-only synchronization such as Loose, in order to dynamically synchronize time-maps with the goal of converging values to the reference accompaniment time-map. A constant window spanning musical duration w into the future is used so as to force the accompaniment to compensate deviations at time t such that it converges at t+w. This leads to continuous curves that are piece-wise linear on musical position output.

This strategy has however two drawbacks:

- Tempo discontinuities are still present despite continuous positions. Such discontinuities lead to wrong feedback to the musician as the accompaniment tempo can change when the musician's tempo is not,
- The constant windowing is not consistent with intermediate updates. One example is the presence of an initial lag at time t̀ which will not alter the predicted musician's time map leading to persisting lags.

SUMMARY

The present disclosure aims to improve the situation.

To that end, it is proposed a method for synchronizing a pre-recorded music accompaniment to a music playing of a user,

- Said user's music playing being captured by at least one microphone delivering an input acoustic signal feeding a processing unit,
- said processing unit comprising a memory for storing data of the pre-recorded music accompaniment and providing an output acoustic signal based on said pre-recorded music accompaniment data to feed at least one loudspeaker playing the music accompaniment for said user,
- Wherein said processing unit:
- analyses the input acoustic signal to detect musical events in the input acoustic signal and determine a tempo in said user's music playing,
- compares the detected musical events to the pre-recorded music accompaniment data to determine at least a lag diff between a timing of the detected musical events and a timing of musical events of the played music accompaniment, said lag diff being to be compensated,
- adapts a timing of the output acoustic signal on the basis of:
  - said lag diff and
  - a synchronization function F given by:

$$F(x) = \begin{cases} \frac{x^2}{w^2} + \left(\$tempo - \frac{2}{w}\right)x + 1 & \text{if } diff > 0 \\ -\frac{x^2}{w^2} + \left(\$tempo + \frac{2}{w}\right)x - 1 & \text{if } diff < 0 \end{cases},$$

Where x is a temporal variable, $tempo is the determined tempo in user's music playing, and w is a duration of compensation of said lag diff.

A notion of "Time-Map" can therefore be used to model musical intentions incoming from a human musician compared to pre-recorded accompaniments. A time-map is a function that maps physical time t to musical time p (in beats).

In a non real-time (or offline) setup, and given the strong assumption that tempo estimation from the device is correct, a time map position p is an integral of the beat multiplied by this tempo from time 0 to t.

However, when the musician does not follow the tempo set in the music score, the estimated tempo in the current playing of the accompaniment needs to be adapted in near future defined by the compensation duration w, and the use of the synchronization function F ensures that convergence is reached to the current user's tempo after that compensation duration.

In an embodiment, said music accompaniment data defines a music score and wherein variable x is a temporal value corresponding to a duration of a variable number of beats of said music score.

In an embodiment, said compensation duration w has a duration of at least one beat on a music score defined by said music accompaniment data.

In an embodiment, said compensation duration w is chosen.

Preferably it can be set to one beat duration, but possibly more, according to a user's choice that can be entered for example through an input of said processing unit.

In an embodiment where the accompaniment data defines a music score, a position pos of the musician playing on said score is forecasted by a linear relation defined as pos(x) =$tempo*x, where x is a number of music beats counted on said music score, and if a lag diff is detected, the synchronization function F(x) is then used so as to define a number of beats $x_{diff}$ corresponding to said lag time diff such that:

$$F(x_{diff})-\text{pos}(x_{diff})=\text{diff}.$$

In this embodiment, a prediction is determined on the basis of said synchronization function F(x), until a next beat $x_{diff}$+w by applying a transformation function A(t), given by:

$$A(t) \overset{def}{=} F(t - t_0 + x_{diff}) + p.$$

Where p is a current position of the musician playing on the music score at current time $t_0$.

In an embodiment where said accompaniment data defines a music score, the processing unit further estimates a future position of the musician playing on said music score at a future synchronization time $t_{sync}$, and determines a tempo (reference e2 of FIG. 3 presented below) of the music accompaniment to apply to the output acoustic signal until said future synchronization time $t_{sync}$.

In this embodiment and when the transformation function A(t) is used, the tempo of the music accompaniment to apply to the output acoustic signal is determined as the derivative of A(t) at current time $t_0$:

$$\text{tempo}=A'(t_0)=F'(x_{diff})$$

(which is known analytically).

In an embodiment, the determination of said musical events in said input acoustic signal comprises:

- extracting acoustic features from said input acoustic signal (for example acoustic pressure, or recognized harmonic frequencies over time),
- using said stored data of the pre-recorded music accompaniment to determine musical events at least in the accompaniment, and
- assigning musical events (attack times of specific music notes for example) to said input acoustic features, on the basis of the musical events determined from said stored data.

In fact, the assignment of musical event can be done onto the music score and for example on the solo part and thus determined by this, and not the "accompaniment" itself. These can be in symbolic music notation format such as MIDI typically. Therefore, the wording "stored data of an accompaniment music score" is to be interpreted broadly and may encompass the situation when such data comprise further a music score of a solo track which is not the accompaniment itself.

An association of the music score events is more generally performed in the pre-recorded accompaniment (time-map).

The present disclosure aims also at a device for synchronizing a pre-recorded music accompaniment to a music playing of a user, comprising a processing unit to perform the method presented above.

It aims also at a computer program comprising instructions which, when the program is executed by a processing unit, cause the processing unit to carry out the method presented above.

It aims also at a computer-readable medium comprising instructions which, when executed by a processing unit, cause the computer to carry out the method.

Therefore, to achieve real-time synchrony between musician and pre-recorded accompaniment, the present disclosure addresses specifically the following drawbacks in the state-of-the-art:

- The Musician's Time-Map is not granted as incoming from the device, and is predicted taking into account high-level musical knowledge such as the inherent Time-Map in the pre-recorded accompaniment;
- When predicting Time-Map for accompaniment output, discontinuities in tempo (and not necessarily position) are not acceptable both musically (by musicians) and technically (for continuous media such as audio or video streams). This alone can disqualify all prior art approaches based on piece-wise linear predictions;
- The resulting real-time Time-Map for driving pre-recorded accompaniment is dependent on both the musician's Time-Map (grasping intentions) and pre-recorded accompaniment Time-Map (high-level musical knowledge).

BRIEF DESCRIPTION OF THE DRAWINGS

More details and advantages of embodiments are given in the detailed specification hereafter and appear in the annexed drawings where.

DETAILED DESCRIPTION

Figure 1:
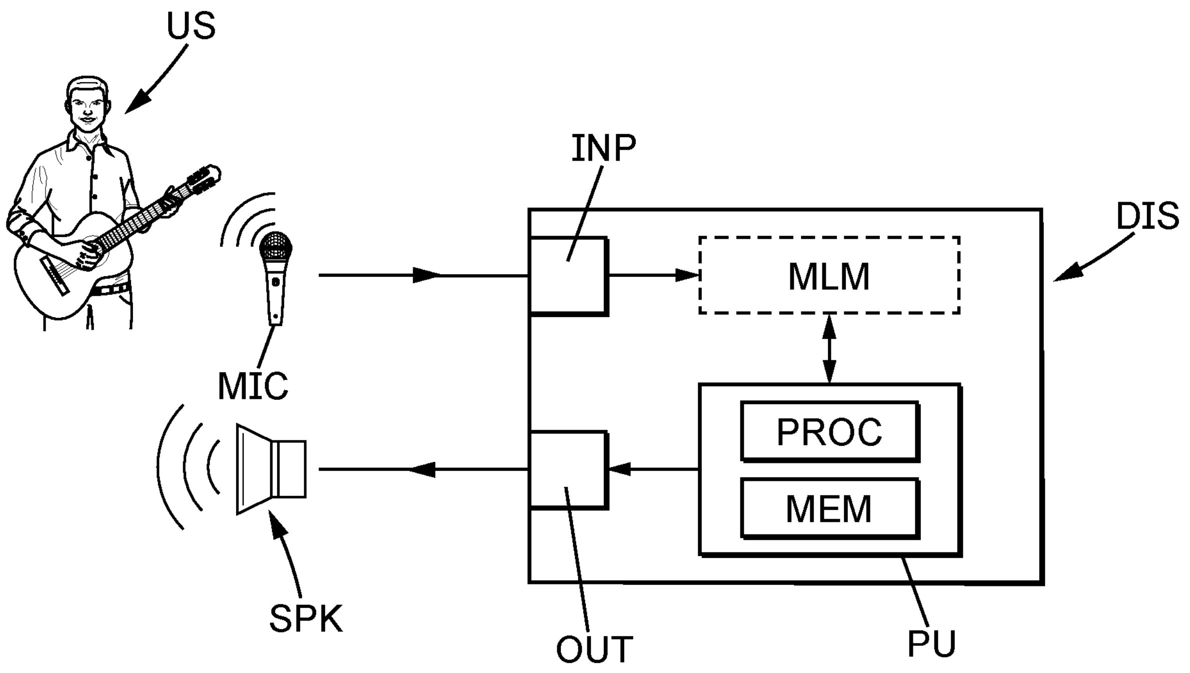
FIG. 1 shows an example of embodiment of a device to perform the aforesaid method.

The present disclosure proposes to solve the problem of synchronizing a pre-recorded accompaniment to a musician in real-time. To this aim, a device DIS (as shown in the example of FIG. 1 which is described hereafter) is used.

The device DIS comprises in an embodiment, at least:

An input interface INP,

A processing unit PU, including a storage memory MEM and a processor PROC cooperating with memory MEM, and An output interface OUT.

The memory MEM can store, inter alia, instructions data of a computer program according to the present disclosure.

Furthermore, music accompaniment data are stored in the processing unit (for example in the memory MEM). Music accompaniment data are therefore read by the processor PROC so as to drive the output interface OUT to feed at least one loudspeaker SPK (a baffle or an earphone) with an output acoustic signal based on the pre-recorded music accompaniment data.

The device DIS further comprises a Machine Listening Module MLM which can include an independent hardware (as shown with dashed lines in FIG. 1), or alternatively can be made of a hardware shared with the processing unit PU (i.e. a same processor and possibly a same memory unit).

A user US can hear the accompaniment music played by the loudspeaker SPK and can play with a music instrument on the accompaniment music, emitting thus a sound captured by a microphone MIC connected to the input interface INP. The microphone MIC can be incorporated in the user's instrument (such as in an electric guitar) or separated (for voice or acoustic instruments recording). The captured sound data are then processed by the machine listening module MLM and more generally by the processing unit PU.

More particularly, the captured sound data are processed so as to identify a delay or an advance of the music played by the user, compared to the accompaniment music, and to adapt then the speed of playing of the accompaniment music to the user's playing. For example, the tempo of the accompaniment music can be adapted accordingly. The time difference which is detected by the module MLM, between the accompaniment music and the music played by the user, is called hereafter "lag" at current time t and noted diff.

More particularly, musician events can be detected in real-time by the machine listening module MLM which outputs then t-uplets of musical events and tempo data pertaining to real-time detection of such events from a music score. This embodiment can be similar for example to the one disclosed in Cont (2010). In the embodiment where the machine listening module MLM has a hardware separated from the processing unit PU, the module MLM is thus exchangeable and can be thus any module that provides "events" and, optionally hereafter the tempo, in real-time, on a given music score, by listening to a musician playing.

As indicated above, the machine listening module MLM operates preferably "in real-time", ideally with a lag of less than 15 milliseconds, which corresponds to a perceptual threshold (ability to react to an event) in most of the current usual listening algorithms.

Thanks to the pre-recorded accompaniment music data on the one hand, and to a tempo recognition in the musician playing on the other hand, the processing unit PU performs a dynamic synchronization. At each real-time instance t, it (PU) takes as input its own previous predictions at a previous time t−ε, and incoming event and tempo from machine listening. The resulting output is an accompaniment time-map that contains predictions at time t.

The synchronization is dynamic and adaptive thanks to prediction outputs at time t, based on a dynamically computed lag-dependent window (hereafter noted w). A dynamic synchronization strategy is introduced and its value is guaranteed mathematically to converge at a later time t_sync. The synchronization anticipation horizon t_sync itself is dependent on the computed lag time at time t with regards to previous instance and feedback from the environment.

The results of the adaptive synchronization strategy are to be consistent (same setup leads to same synchronization prediction). The adaptive synchronization strategy should also adapt to an interactive context.

The device DIS takes as live input musician's event and tempo, and outputs predictions for a pre-recorded accompaniment, having both pre-recorded accompaniment and music score at its disposal prior to launch. The role of the device DIS is to employ musician's Time-Map (as a result of live input) and construct a corresponding Synchronization Time-Map dynamically.

Instead of relying on a constant window length (like in state of the art), the parameter w is interpreted here as a stiffness parameter. Typically, w can correspond to a fixed number of beats of the score (for example one beat, corresponding to a quarter note of a 4/4 measure). Its time current value tv can be given at the real tempo of the accompaniment (tv=w*real tempo), which however does not necessarily correspond to the current musician tempo. The prediction window length w is determined dynamically (as detailed below with reference to FIG. 3) as a function of current lag diff at time t and assures convergence until a later synchronization time t_sync.

In an embodiment, a synchronization function F is introduced, whose role is to help construct the synchronization time-map and to compensate the lag diff in an ideal setup where the tempo is supposed to be, in a short time-frame, a constant value. Given the musician's position p (on a music score) and the musician's tempo noted hereafter "$tempo" at time t, F is a quadratic function that joins Time-Map points (0, 1) to (w, w*$tempo) and checks that its derivative is equal to parameter $tempo. The lag at time t between the musician's real-time musical position on the music score and that of the accompaniment track on the same score (both in beats) is denoted as diff. Therefore, parameter diff reflects exactly the difference between the position on the music score in beats of the detected musician's event in real-time and the position on the music score (in beats) of the accompaniment music that is to be synchronized.

It is shown here that the synchronization function F can be expressed as follows:

$$F(x) = \begin{cases} \frac{x^2}{w^2} + \left(\$\text{tempo} - \frac{2}{w}\right)x + 1 & \text{if } \mathit{diff} > 0 \\ -\frac{x^2}{w^2} + \left(\$\text{tempo} + \frac{2}{w}\right)x - 1 & \text{if } \mathit{diff} < 0 \end{cases}$$

and if diff=0, F(x) simply becomes F(x)=$tempo*x where $tempo is the real tempo value provided by the module MLM, w is a prediction window corresponding finally to the time taken to compensate the lag diff until a next adjustment of the music accompaniment on the musician playing.

It is shown furthermore that, for any event detected at time t, and accompaniment lag diff beats ahead, there is a single solution $x_{diff}$ of the equation F(x)−$tempo*x=diff. This unique solution defines the adaptive context on which predictions are computed and re-defines the portion of accompaniment map from $x_{diff}$ as:

$$A(t) \stackrel{def}{=} F(t - t_0 + x_{diff}) + p.$$

A detailed explanation of the adaptation function A(t) is given hereafter.

By construction, the synchronizing accompaniment Time-Map converges in position and tempo at time t_sync=t+w−$x_{diff}$ to the musician Time-Map. This mathematical construction ensures continuity of tempo until a synchronization time t_sync.

Figure 3:
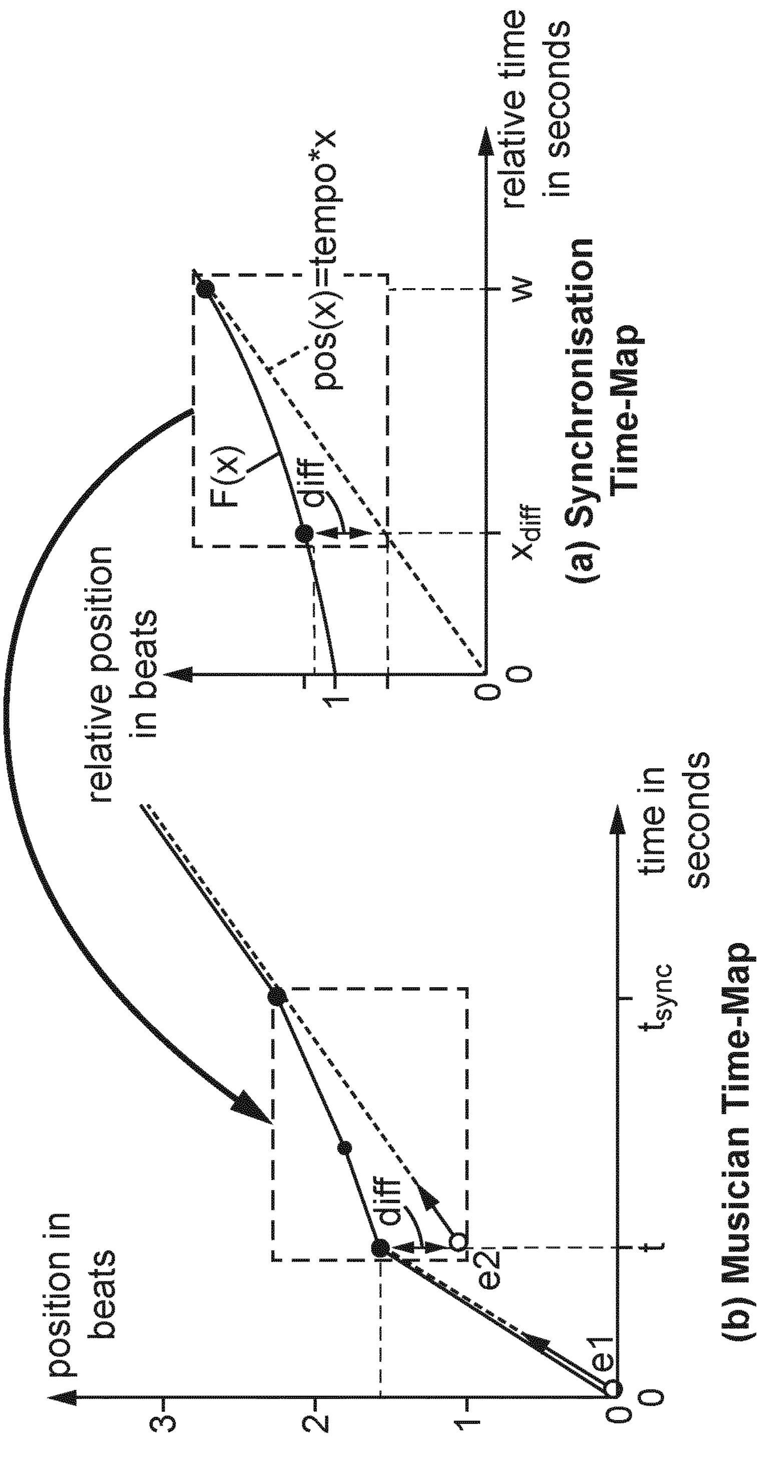
FIG. 3 shows an example of (a) a synchronization Time-Map using the synchronization function F(x) and (b) the corresponding musician time-map.

FIG. 3 shows the adaptive dynamic synchronization for updating accompaniment Time-Map, at time t, where an event is detected and the initial lag of the accompaniment is diff beats ahead (FIG. 3*a*). The accompaniment map from t is defined as a translated portion of function F. The synchronization Time-Map, constructed by F(x) is depicted in FIG. 3(*a*) and its translation to the Musician Time-Map on FIG. 3(*b*). Position and tempo converge at time t_sync assuming musician tempo remains constant in that interval. This Time-Map is constantly re-evaluated at each interaction of the system with a human musician. The continuity of tempo until time t_sync can be noticed.

A simple explanation of FIG. 3 can be given as follows. From the previous prediction, a forecast position pos that the musician playing should have (counted in beats x) is determined by a linear relation such as pos(x)=$tempo*x. This corresponds to the oblique dashed line of FIG. 3*a*. However, a lag diff is detected between the position p of the musician playing and the forecast position pos. The synchronization function F(x) is calculated as defined above and $x_{diff}$ is calculated such that F($x_{diff}$)−pos($x_{diff}$)=diff. A prediction can be determined then, on the basis of F(x), until the next beat $x_{diff}$+w. This corresponds to the dashed lined rectangle of FIG. 3*a*. This "rectangle" of FIG. 3*a* is rather imported in the musician time-map of FIG. 3*b*, and translated by applying the transformation function A(t), given by:

$$A(t) \stackrel{def}{=} F(t - t_0 + x_{diff}) + p.$$

Where p is the current position of the musician playing on the score at current time $t_0$. Then A(t) can be computed to give the right position that the musician playing should have in a future time $t_{sync}$. Until this synchronization time $t_{sync}$ at least, the tempo of the accompaniment is adapted. It corresponds to a new slope $e_2$ (oblique dashed line of FIG. 3*b*), to compare with the previous slope $e_1$. The corrected tempo ctempo can be thus given as the derivative of A(t) at current time $t_0$ or:

$$ctempo = A'(t_0) = F'(x_{diff})$$

which is known analytically.

Figure 2:
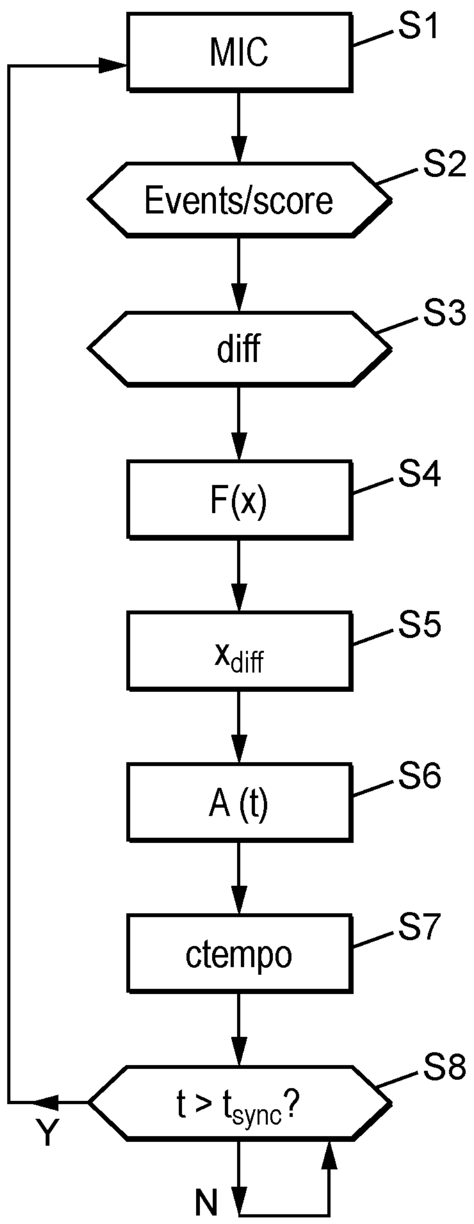
FIG. 2 is an example of algorithm comprising steps of the aforesaid method according to an embodiment.

Referring now to FIG. 2, step S1 starts with receiving the input signal related to the musician playing. In step S2, acoustic features are extracted from the input signal so as to identify musical events in the musician playing which are related to events in the music score defined in the pre-recorded music accompaniment data. In step S3, a timing of a latest detected event is compared to the timing of a corresponding one in the score and the time lag diff corresponding to the timing difference is determined.

On the basis of that time lag and a chosen duration w (a duration of a chosen number of beats in the music score typically), the synchronization function F(x) can be determined in step S4. Then, in step S5, $x_{diff}$ can be the sole solution given by F($x_{diff}$)−$tempo*$x_{diff}$=diff The determination of $x_{diff}$ makes it then possible to use the transformation function A(t) which is determined in step S6, so as to shift from the synchronization map to the musician time-map as explained above while referring to FIGS. 3*a* and 3*b*. In the musician time-map, in step S7 the tempo of the output signal which is played on the basis of the pre-recorded accompaniment data can be corrected (from slope e1 to slope e2 of FIG. 3*b*) so as to adjust smoothly the position on the music score of the output signal to the position of the input signal at a future next synchronization time $t_{sync}$ as shown on FIG. 3*b*. After that synchronization time $t_{sync}$ in step S8 (arrow Y from test S8), the process can be implemented again by extracting new features from the input signal.

Qualitatively, this embodiment contributes to reach the following advantages:

- It resolves the consistency issue in the state of the art. It adapts to initial lags automatically and adapts its horizon based on context. The mathematical formalism is bijective with the solution. This means that identical musician Time-Map lead to the same synchronization trajectories whereas in traditional constant window this value would differ based on context and parameters.
- The method ensures tempo continuity at time t_sync where as state-of-the-art demonstrate discontinuities in all available methods.
- The adaptive strategy provides a compromise between the two extremes described above as tight and loose and within a single framework. The tight strategy corresponds to low values of stiffness parameter w whereas loose strategy corresponds to higher values of w.
- The strategy is computationally efficient: As long as the prediction time-map does not change, accompaniment synchronization is computed only once using the accompaniment time-map. State-of-the-art requires computations and predictions at every stage of interaction regardless of change.

Moreover, high-level musical knowledge can be integrated into the synchronization mechanism in form of Time-Maps. To this end, predictions are extended to non-linear curves on Time-Maps. This extension allows formalisms for integrating musical expressivity such as accelerendi and fermata (i.e. with an adaptive tempo) and other common expressive musical specifications of performer's timing. This addition also enables the possibilities of automatic learning of such parameters from existing data.

- It enables the addition of high-level musical knowledge, if existing, into the existing framework using mathematical formalism with proof of convergence, overcoming the hand-engineering methods in the usual prior art.
- It extends the "constant tempo" approximation in the usual prior art that leads to piece-wise linear predictions, to the more realistic non-linear tempo predictions.
- It enables the possibility of automatically learning prediction time-maps either from musician or pre-recorded accompaniments to leverage expressivity.

Additional latencies are usually imposed by hardware implementations and networks communications. Compensating this latency in an interactive setup can not be reduced to a simple translation of the reading head (as seen in over-the-air audio/video streaming synchronization). The value of such latency can vary from 100 milliseconds to 1 second, which is far beyond acceptable psychoacoustic limits of human ear. The synchronization strategy takes this value optionally as input, and anticipates all output predictions based on the interactive context. As a result and for relatively small values of latency (in mid-range of 300 ms corresponding to most Bluetooth and AirMedia streaming formats), it is not necessary for the user to adjust the lag prior to performance. The general approach, expressed here in "musical time" as opposed to "physical time", allows automatic adjustment of such parameter.

More generally, this disclosure is not limited to the detailed features presented above as examples of embodiments; it encompasses further embodiments.

Typically, the wordings related to "playing the accompaniment" on a "loudspeaker" and the notion of "pre-recorded music accompaniment" are to be interpreted broadly. In fact, the method applies to any "continuous" media, including for example audio and video. Indeed, video+audio content can be synchronized as well using the same method as presented above. Typically, the aforesaid "loudspeakers" can be replaced by an Audio-Video projection and video frames can thus be interpolated as presented above simply based on the position output of prediction for synchronization.

The invention claimed is:

1. A method for synchronizing a pre-recorded music accompaniment to a music playing of a user, said user's music playing being captured by at least one microphone delivering an input acoustic signal feeding a processing unit, said processing unit comprising a memory for storing data of the pre-recorded music accompaniment and providing an output acoustic signal based on said pre-recorded music accompaniment data to feed at least one loudspeaker playing the music accompaniment for said user, wherein said processing unit, in real-time:

analyses the input acoustic signal to detect musical events in the input acoustic signal so as to determine a tempo in said user's music playing, compares the detected musical events to the pre-recorded music accompaniment data to determine at least a lag diff between a timing of the detected musical events and a timing of musical events of the played music accompaniment, said lag diff being to be compensated, adapts a timing of the output acoustic signal to provide a continuous tempo convergence by transforming an audio playback stream of the pre-recorded music accompaniment fed to the at least one loudspeaker without introducing audible tempo discontinuities, on the basis of:

said lag diff and a synchronization function F given by:

$$F(x) = \begin{cases} \frac{x^2}{w^2} + \left(\$\text{tempo} - \frac{2}{w}\right)x + 1 & \text{if } diff > 0 \\ -\frac{x^2}{w^2} + \left(\$\text{tempo} + \frac{2}{w}\right)x - 1 & \text{if } diff < 0 \end{cases},$$

where x is a temporal variable, $tempo is the determined tempo in said user's music playing, and w is a duration of compensation of said lag diff, wherein the processing unit continuously modulates a playback speed of the output acoustic signal outputted by the at least one loudspeaker according to the synchronization function F(x) until the lag diff is compensated over the duration w.

2. The method according to claim 1, wherein said music accompaniment data defines a music score and wherein variable x is a temporal value corresponding to a duration of a variable number of beats of said music score.

3. The method according to claim 1, wherein w has a duration of at least one beat on a music score defined by said music accompaniment data.

4. The method according to claim 1, wherein the duration w is chosen.

5. The method according to claim 1, wherein, said accompaniment data defining a music score, a position pos of the musician playing on said score is forecast by a linear relation defined as pos(x)=$tempo*x, where x is a number of music beats counted on said music score, and if a lag diff is detected, said synchronisation function F(x) is used so as to define a number of beats $x_{diff}$ corresponding to said lag time diff such that:

$$F(x_{diff}) - \text{pos}(x_{diff}) = \text{diff}.$$

6. The method according to claim 5, wherein a prediction is determined on the basis of said synchronisation function F(x), until a next beat $x_{diff}$+w by applying a transformation function A(t), given by:

$$A(t) \overset{def}{=} F(t - t_0 + x_{diff}) + p,$$

where p is a current position of the musician playing on the music score at current time $t_0$.

7. The method according to claim 1, wherein, said accompaniment data defining a music score, the processing unit further estimates a future position of the musician playing on said music score at a future synchronization time $t_{sync}$, and determines a tempo (e2) of the music accompaniment to apply to the output acoustic signal until said future synchronization time $t_{sync}$.

8. The method of claim 7, wherein a prediction is determined on the basis of said synchronisation function F(x), until a next beat $x_{diff}$+w by applying a transformation function A(t), given by:

$$A(t) \overset{def}{=} F(t - t_0 + x_{diff}) + p,$$

where p is a current position of the musician playing on the music score at current time $t_0$, and wherein said tempo of the music accompaniment to apply to the output acoustic signal noted ctempo, is determined as the derivative of A(t) at current time $t_0$ such that:

$$c\text{tempo} = A'(t_0) = F'(x_{diff}).$$

9. The method according to claim 1, wherein the determination of said musical events in said input acoustic signal comprises:

extracting acoustic features from said input acoustic signal, using said stored data of the pre-recorded music accompaniment to determine musical events at least in the accompaniment, and assigning musical events to said input acoustic features, on the basis of the musical events determined from said stored data.

10. A device for synchronizing a pre-recorded music accompaniment to a music playing of a user, comprising a processing unit to perform the method as claimed in claim 1.

11. A computer-readable medium comprising instructions which, when executed by a processing unit, cause the computer to carry out the method according to claim 1.

* * * * *